United States Patent [19]

Shurtliff

[11] Patent Number: 4,616,738
[45] Date of Patent: Oct. 14, 1986

[54] DAMPED BORING BAR AND TOOL HOLDER

[76] Inventor: Norval E. Shurtliff, 87486 Cinnabar La., Veneta, Oreg. 97487

[21] Appl. No.: 517,665

[22] Filed: Jul. 27, 1983

[51] Int. Cl.[4] .......................... B23B 29/02; F16F 7/10
[52] U.S. Cl. .................................. 188/380; 408/143; 409/141
[58] Field of Search ............... 188/378, 379, 380, 381, 188/322.5; 267/137, 140.1, 140.5, 182; 82/DIG. 9; 408/143; 409/141

[56] References Cited

U.S. PATENT DOCUMENTS

| | | | |
|---|---|---|---|
| 2,591,115 | 4/1952 | Austin | 408/143 X |
| 3,172,308 | 3/1965 | Shurtliff | 408/143 |
| 3,230,833 | 1/1966 | Shurtliff | 409/141 |
| 3,582,226 | 6/1971 | Shurtliff | 409/141 X |
| 3,601,229 | 8/1971 | Shurtliff | 188/380 |
| 3,774,730 | 11/1973 | Maddux | 188/379 |
| 4,061,438 | 12/1977 | New | 408/143 |

FOREIGN PATENT DOCUMENTS 52-8271  1/1977  Japan ...................... 188/322.5

Primary Examiner—Bruce H. Stoner, Jr.
Assistant Examiner—Richard R. Diefendorf
Attorney, Agent, or Firm—Eugene D. Farley

[57] ABSTRACT

A damped boring bar assembly for damping the vibrations encountered during the high-speed boring of titanium, zirconium, and their alloys and the like, as well as steel and other metals, especially when the overhang, or ratio of the diameter to depth of the bored hole, is very small. The boring bar assembly has a weighted damper body contained within a hollow elongated case, the tool-holding end of which is closed and incorporates a shaped inner face with a frictional sliding surface. The damper body also has a frictionally slidable element which, with the damper body, holds a resilient element in compression in an internal cavity. The frictionally slidable element has a shaped face having a frictional surface thereon which engages the frictional surface of the inner face of the elongated case during vibration. The damping mechanism can be adjusted to handle different machining conditions.

6 Claims, 6 Drawing Figures

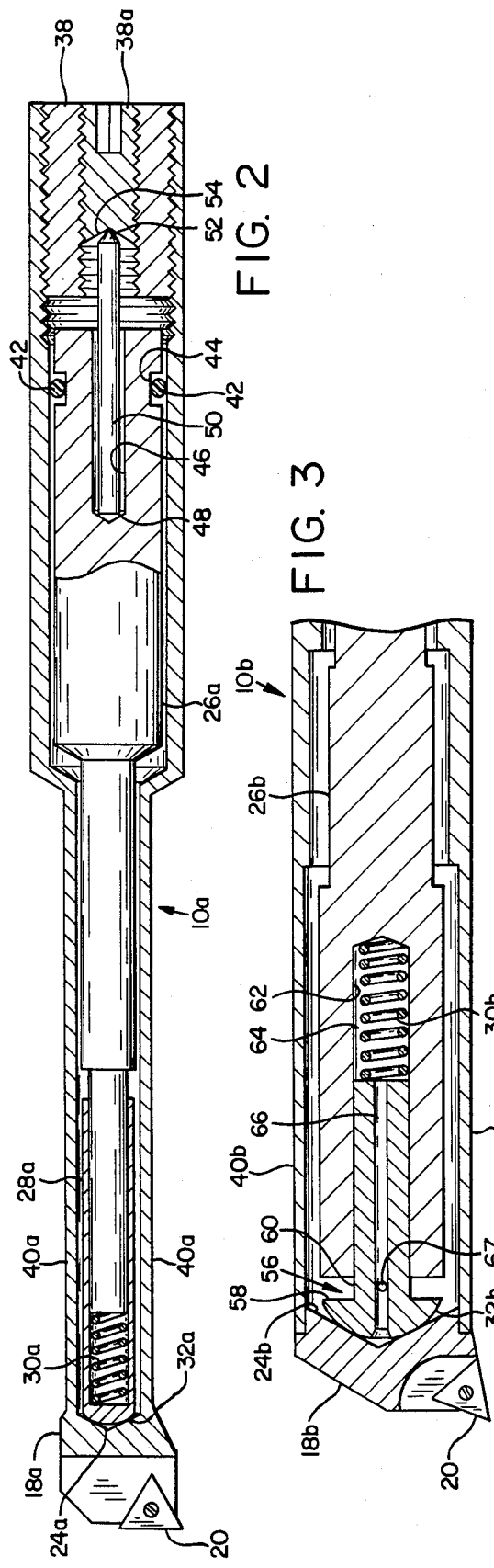
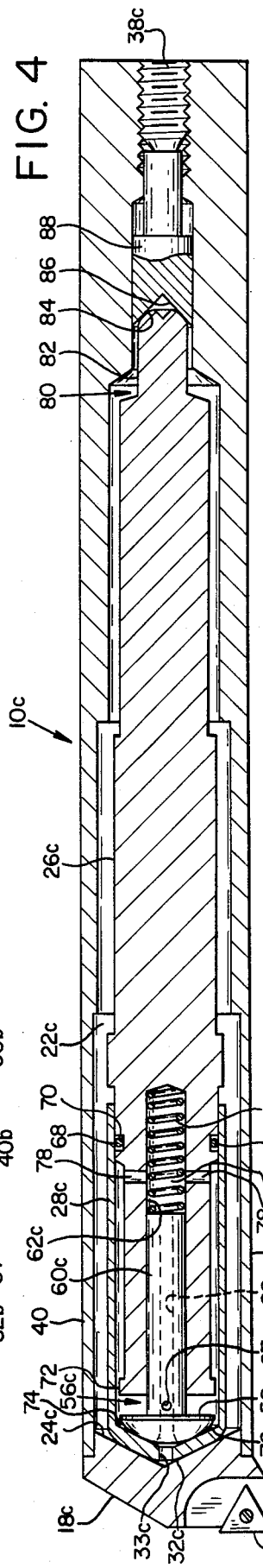
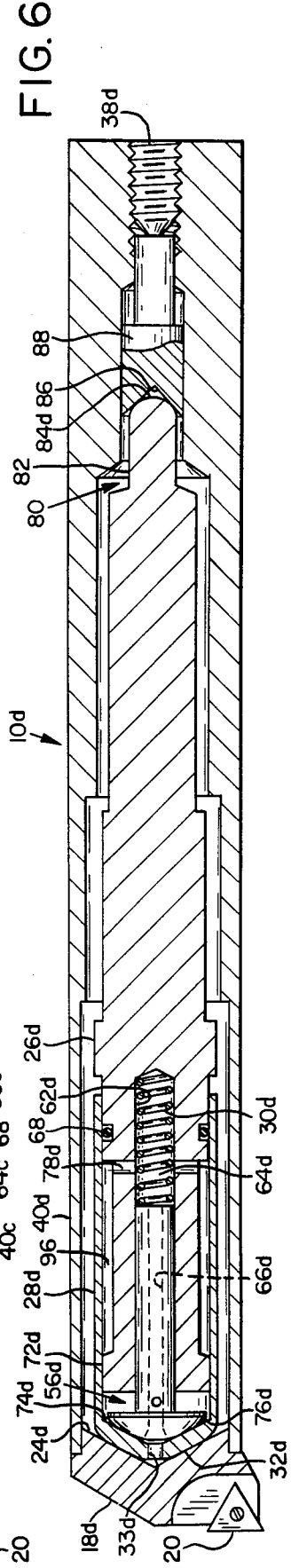

DAMPED BORING BAR AND TOOL HOLDER

BACKGROUND OF THE INVENTION

This invention relates to machine-tool boring bars in general, and to vibration damping devices for such boring bars in particular.

A pervasive problem in the high speed machining of the harder materials such as titanium, zirconium and their alloys is the tool vibration encountered, especially when boring holes in which the diameter is small compared to the depth of the bore. The present inventor has made several improvements in the design of boring bars for such work, with significant reductions in tool vibration and a consequent improvement in machining speed as the result.

Shurtliff U.S. Pat. No. 3,172,308 discloses a damped boring bar in which the damping action is accomplished by a spring-loaded damper body internally suspended in the boring bar and made massive by filling an internal cavity in the damper body with a heavy metal such as lead. Some damping action may also occur because the suspension of one end of the suspended damper body may permit minute lateral frictional movements in response to vibration. Adjusting the tension of the loading spring permits some compensation for machining variables.

Shurtliff U.S. Pat. No. 3,230,833 discloses an improvement in damped boring bars in which the minute lateral movement of the suspended internal damper body is encouraged by shaping the moving end of the internal damper body. Further damping effect is obtained by filling the central cavity of the suspended damper body with heavy metal particles, themselves suspended in a heavy viscous liquid, such as mercury. Shaping the suspended damper body so that most of its mass is located close to the cutting tool is also disclosed. Again, adjusting the tension of the loading spring compensates for a broadened range of machining variables—and thus vibration frequencies—over the previous disclosure.

Shurtliff U.S. Pat. No. 3,582,226 discloses yet another improvement, in which the suspended internal damper body, now shaped to place most of the damper mass as close as possible to the cutting tool, also contains additional internal dampers which depend for their efficacy on multiple minute lateral frictional movements. Because these additional dampers have differing masses, the range of vibration frequencies successfully damped is broadened even more over the prior disclosures. Adjusting the tension of the loading spring permits compensation for machining variables.

Shurtliff U.S. Pat. No. 3,601,229 discloses a further improvement over the above-referenced disclosures, in that the shaped, suspended internal damper body now incorporates a slidable cap on the massive end of the damper body. The movements of the slidable cap alternately enlarge and diminish a cavity filled with hydraulic fluid, this cavity being created by the space between the damper body and the cap. As a result of this alternate enlarging and diminishing of the cavity, hydraulic fluid is forced through small channels, giving a further hydraulic damping effect, in addition to the frictional and inertial damping inherent in the design. The range of vibration frequencies which can be damped successfully is increased substantially over the prior references, and adjusting the spring loading permits compensating for an increased range of machining variables.

One feature common to the above discussed references is that the damper body moves longitudinally as well as laterally, by the very nature of the design, and this may have certain undesirable effects. For example, although lateral tool vibration may be almost entirely eliminated, longitudinal vibration, because of the massive nature of the damper, may be present and may have an adverse effect upon the tool during very precise finishing operations.

SUMMARY OF THE PRESENT INVENTION

The present invention overcomes the drawbacks of the previous damped boring bars by providing a damped boring bar of substantially simpler construction which has substantially reduced damper mass movement in the longitudinal direction. It accomplishes this by limiting any longitudinal movement of damper elements to a slidable cap or piston or a combination of them, the mass of which is small compared to the mass of the damper body itself or to the total mass of the boring bar. Thus, any longitudinal vibration due to the damping action of the damping mechanism is insignificant compared to the mass of the machine with which the boring bar is used and will have little effect upon even precision finishing operations.

It is, therefore, an object of the present invention to provide a damped boring bar and tool-holder for the high-speed machining of very hard metals with reduced longitudinal vibration.

It is a further object of the present invention to provide a damped boring bar and tool holder which can perform high-speed boring in very hard metals at depth-to-diameter ratios of from 12-to-1 to 14-to-1.

It is a still further object of the present invention to provide a damped boring bar and tool-holder with an outside diameter smaller than heretofore available.

It is yet another object of the present invention to provide a damped boring bar and tool-holder for the high-speed machining and boring of very hard metals which is more simple and economical to manufacture than presently available tools of like kind.

These and other objects, features and advantages of the present invention will become apparent and more readily understood upon consideration of the following detailed description, taken in conjunction with the accompanying drawings.

BRIEF DESCRIPTION OF THE DRAWINGS

FIG. 2 is a view in longitudinal section of an alternate form of the invention disclosed in FIG. 1 having a very small diameter, and taken on a horizontal plane.

FIG. 3 is a fragmentary view in longitudinal section of another embodiment of the resilient element of the invention, taken on a horizontal plane.

FIG. 4 is a view similar to FIG. 2 and illustrating a still further embodiment of the damper body of the invention.

FIG. 6 illustrates a further embodiment of the invention, taken on a horizontal sectional plane.

DETAILED DESCRIPTION OF THE INVENTION

Figure 1:
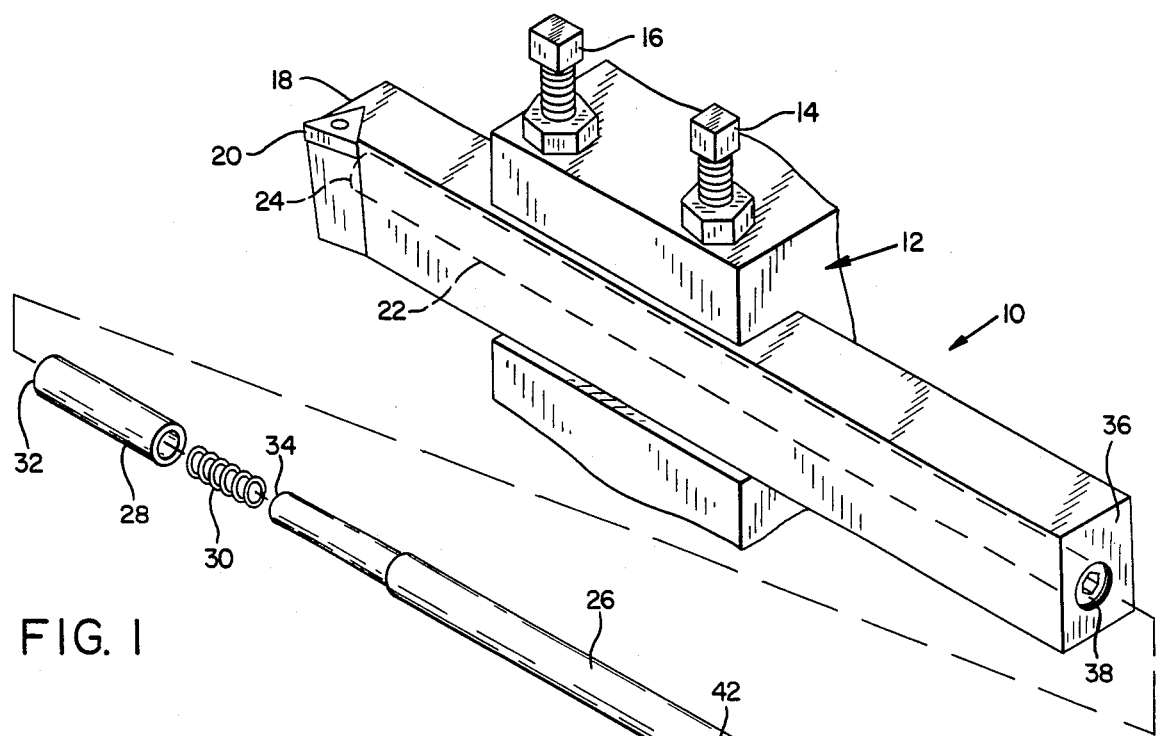
FIG. 1 is an oblique view of one embodiment of the present invention disclosing structural and assembly details, as well as an exemplary mounting mode.

Turning now to FIG. 1, we see an oblique view of one embodiment of the invention, illustrative of a typical mounting on a machine tool and of the way the elements of the invention are assembled. A boring bar and tool-holder, modified to incorporate the features of the invention, is shown at 10. It is held in place in the illustrative mounting 12 by the pressure of the bolts 14 and 16. The tool-holder 10 has, on its reach, or tool-holding end 18, means for fixedly mounting any of several well-known metal-cutting tips, 20. The mounting method and style of cutting are irrelevant to the invention herein described, except insofar as they serve to generate and transmit any vibration during high-speed machining of very hard metals.

The boring bar/tool-holder 10 is shown in FIG. 1 with a rectangular cross-section, but cross-sectional shape is irrelevant, except insofar as a circular cross section gives the greatest strength for a given maximum cross-sectional dimension and thus determines the minimum feasible diameter for a tool of this type. The configuration disclosed in FIG. 2 has been successfully used for boring bars with a diameter as small as $\frac{3}{8}$", and there seems to be no reason that it could not be extended to even smaller diameters, using appropriate materials. However, the boring bar/tool-holder 10 of the invention could have any reasonable cross-sectional shape without departing from the spirit or intent of the invention.

The boring bar/tool-holder 10 has therein an axial cavity 22 (shown in dashed line outline) lying more or less along the longitudinal axis of its longest dimension. The axial cavity 22 terminates just short of the reach end 18 of the boring bar/tool-holder 10; it is immaterial to the invention whether this is by forming process or by construction. For example, FIG. 2 discloses the reach end 18a of the boring bar 10a to be formed integrally with the case 40a of the bar, whereas FIGS. 3-6 disclose a construction wherein the reach end is formed separately and attached to the case 40 by some appropriate means which will enable the structure to withstand the shocks and impacts encountered in the usage for which it is designed.

The inner face 24 of the axial cavity 22 has a shape to be described in greater detail hereinafter in connection with FIGS. 2-6, especially FIGS. 3 and 5.

Inserted into the axial cavity 22 is a damper body 26, shown with its component parts in exploded view. The damper body has a longitudinally, resiliently slidable sleeve 28 at the reach end of the axial cavity 22, and a resilient means 30, typically a spring as shown, contained within a chamber formed by the closed tip 32 of the sleeve 28 and the face 34 of the damper body 26. Resilient means 30 can be any device or structure which imparts a resilient action to the sleeve.

The shank, or far, end 36 of the boring bar/tool-holder 10 contains an element 38 which, in this embodiment, serves both as a closure element and as an adjustment element, to adjust the compression in resilient element 30 to compensate for different machining variables. As disclosed in the embodiment of FIG. 2, closure element 38 can be separated from the adjustment function by including adjustment element 38a. FIGS. 4 and 6 disclose the two functions combined.

Closure element 38 can be a simple set-screw, as disclosed in FIGS. 1, 4 and 6, or it could be a more complex closure device such as a bayonet-type closure, or a cammed, breech-block type closure, maintaining a fluid-tight seal.

The end of damper body 26 which is closest to the shank end 36 of boring bar 10 includes an O-ring 42 mounted in a groove 44, which is wide with respect to the O-ring, as disclosed in FIGS. 1 and 2. The shank end of damper body 26 also includes an axial bore 46 which extends a short distance toward the reach end, as seen more clearly in FIG. 2. The internal end of this axial bore terminates in a conically concave surface 48, and seated on this surface is a rod 50 which extends axially out of the bore 46 to conically concave surface 54 on the inner face of closure element 38 (FIG. 1) or adjustable element 38a (FIG. 2). The end 52 of rod 50 is conically convex at a more acute angle than conically concave surface 54 so that damper body 26 is constrained to remain in a centered position in the absence of vibration, by the combined effect of O-ring 42 and rod 50, with its ends resting in conically concave surfaces 48 and 54.

The internal face 24 of the reach end 18 of the boring bar 10 has a conically concave shape 24 which, in conjunction with the shape of the closed tip 32 of the slidable element 28, tends to keep the damper body 26 centered in the axial cavity 22 at all times, and it is from this action that the damping effect of the invention in part derives. The shape of the tip 32 is curvedly convex, so that it curves smoothly away in both directions from the line of contact. It will be obvious to those skilled in the art that the face 24 could be curvedly convex, while the tip 32 could be conically concave without affecting the damping effect. The surface of face 24 and the surface of tip 32 are frictionally slidable, rather than without friction, thus helping to dissipate the vibrational energy.

In the disclosures of FIGS. 2-6, when cutting tip 20 tends to move from its rest position in any direction due to one or more machining factors, the inertial mass of damper body 26 tends to keep the damper body in its rest position. However, the frictional nature of the contact between face 24 and tip 32 tends to move damper body 26 or tends to resist the movement of cutting tip 20, while the sloping nature of the conically concave face 24 tends to slidably force the slidable element or cap 28 longitudinally toward the body of damper body 26, compressing resilient means 30 and increasing the frictional contact between face 24 and tip 32, further resisting the movement of cutting tip 20.

FIG. 3 discloses a further embodiment of the damper mechanism, in which the slidable element or cap piece 56 corresponds to the slidable element 28a in FIG. 2. Cap piece 56 has a mushroom-shaped head 58 and stem 60, which longitudinally resiliently slides in axial bore 62 and compresses resilient means 30b. Resilient means 30b provides continuous pressure between the face 32b of cap piece 56 and the face 24b of the inner surface of reach end 18. The degree of pressure can be adjusted by element 38, as disclosed in FIG. 1.

In addition to this damper mechanism, the chamber 64, in axial bore 62 behind stem 60, contains a quantity of lubricating fluid for lubricating the frictional fit between stem 60 and axial bore 62, as well as trapped air, which will alternately be compressed and rarified, adding further damping. The reach end 58 has a frictional bearing surface on its face 32b, to help dissipate the vibrational energy more effficiently.

It will be apparent from a comparison of FIGS. 2 and 3 that the configuration of the damper body 26b in FIG. 3 concentrates more of the mass of the damper body close to the reach end 18 of the boring bar and toolholder 10b than does the structure disclosed in FIG. 2, which is for a boring bar of very small external diameter, as discussed hereinbefore. Where diameter of the boring bar is not the major consideration, as in FIGS. 3-6, the major portion of the damper body can be concentrated close to the cutting tool, improving the damping efficiency.

Figure 5:
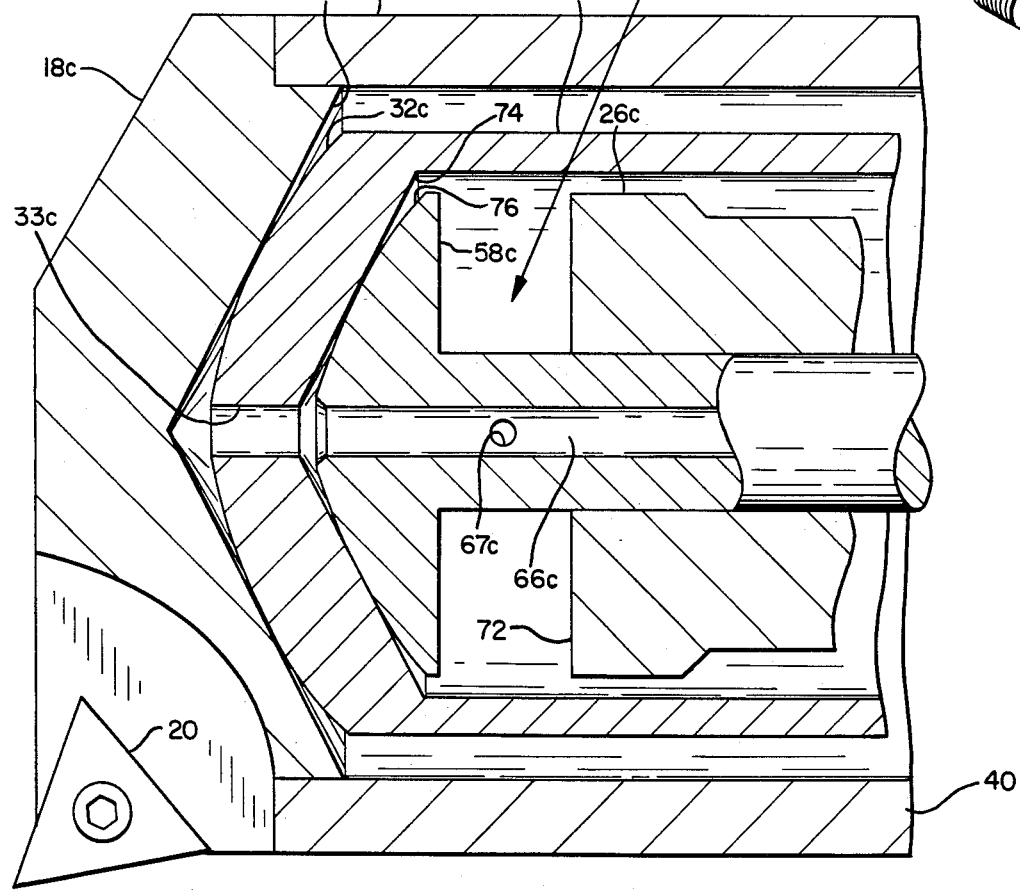
FIG. 5 is an enlarged, fragmentary view in longitudinal section of the embodiment disclosed in FIG. 4.

Turning now to FIGS. 4 and 5, we see boring bar/tool-holder 10c with reach end 18c attached by appropriate means to the case 40c. The internal face 24c is shown with conically concave shape, but any other shape which performs the function, in cooperation with shaped tip 32c, of keeping damper body 26c centered in axial cavity 22c, would be acceptable. Damper body 26c has a sleeve 28c as a slidable element, forming a cap which has limited longitudinal movement on the damper body.

To provide a fluid-tight seal for the slidable cap 28c, O-ring 68 is contained within a groove 70 which is wide with respect to the O-ring thickness. The end 72 of damper body 26c closest to reach end 18c has a diameter which is slightly smaller than the inside diameter of slidable cap 28c. This reach end portion of damper body 26c includes axial bore 62c, within which rides stem 60c of second slidable element 56c, with mushroom-shaped head 58c. The internal face 74 of slidable cap 28c is conically concave in shape, while face 76 of head 58c is curvedly convex, smoothly curving away from its zone of contact with face 74. Holes 66c, 67c and 78 permit passage of viscous fluid and air from axial cavity 64c into the space bounded by damper body 26c and sleeve 28c, for ease in assembly. The shank end 80 of damper body 26c incorporates shank 82 which has a hemispherically-shaped tip 84 resting in conically concave depression 86 of follower 88. The follower bears upon adjustment means 38c, permitting adjustment of compression in resilient means 30c.

Vibration due to various machining factors is either eliminated or substantially reduced by several of the features hereinbefore described. Lateral movement of the tool 20 is transformed into longitudinal movement of slidable cap 28c and second slidable element 56c (the piston-like element), because of the inertial resistance of damper body 26c to lateral movement. A substantial proportion of the energy of vibration is absorbed by the frictional nature of the contact between the pairs of faces 24c-32c and 74-76. A further substantial proportion of the vibrational energy is absorbed by the resilient means 30c. The balance of the energy is dissipated as heat, generated by the various movements described hereinbefore, most notably the frictional movements.

Further, if the taper of the conically concave surface 74 is less than the taper of conically concave surface 24c, the curvedly convex surface 76 will move laterally with respect to conically concave surface 74, with the amount of movement depending upon the amount of difference in the respective tapers. However, if the taper of surface 74 is equal to or greater than the taper of surface 24c, there will be no lateral movement.

Finally, adjusting the compression of resilient means 30c permits a substantial degree of adjustment to the different frequencies caused by different combinations of tool and workpiece materials, machining speeds, depth of cuts, and other machining factors.

Turning to FIG. 6, wherein the same components as FIG. 4 are identified by the subscript "d", rather than the subscript "c", we see a further embodiment of the invention, in which the end 72d of damper body 26d has a frictionally slidable fit inside of slidable cap 28d. This is the preferred design for boring bars which are to be used in a rotary spindle machine.

In all of the above embodiments, it will be seen that the damper body has generally the same shape as the internal axial cavity of the boring bar/tool holder, except that the dimensions of the damper body are slightly less than that of the cavity, so that there is a separation between the surface of the damper body and the internal surface of the cavity. This separation ranges from 1/64" to ¼", depending upon the overall size of the boring bar/tool holder. Typically, a spacing of about 1/32" has been found to be satisfactory.

In use, the boring bars/tool holders of the foregoing description have been found to bore holes in titanium, at acceptable production rates, with a depth-to-diameter ratio of greater than 16 to 1. In zirconium, 2" holes have been bored to a depth of 24" at acceptable production rates.

A further significant benefit of the present invention is than it has substantially fewer parts which require substantially fewer operations to manufacture than do boring bars of previous designs. For example, the savings in time alone required to manufacture boring bars/tool holders according to the present invention is up to three-quarters of the time required to manufacture boring bars/tool holders according to previous designs. Consequently, the savings in manufacturing costs from the use of the present invention can be substantial.

The terms and expressions employed in the foregoing specification are used therein as terms of description and not as terms of limitation, and there is no intention, in the use of such terms and expressions, of excluding equivalents of the features shown and described, or of portions thereof, it being recognized that the scope of the invention is defined and limited only by the claims which follow.

What is claimed as my invention is:
1. A damped tool-holding assembly comprising:
 (a) a hollow elongated case having a reach end and a shank end, the reach end being closed and having an inner front face and the shank end being open;
 (b) tool-holding means on the reach end of the case;
 (c) the inner front face of the closed reach end of the case providing a frictional bearing surface;
 (d) within the case a weighted elongated damper body having a reach end and a shank end, the reach end having an axial bore therein;
 (e) a cap piece having a reach end and extending longitudinally beyond and spaced from the reach end of the damper body and having a frictional bearing surface on its reach end;
 (f) the cap piece including a stem extending from the reach end thereof dimensioned for sliding fit in said axial bore for mounting the cap piece for longitudinal movement relative to the reach end of the damper body with the frictional bearing surface of the cap piece in frictional bearing engagement with the frictional bearing surface on the case; and
 (g) resilient pressure applying spring means directly engaging both the damper body and the stem of the cap piece for pressing the frictional bearing surface on the reach end of the cap piece against the frictional bearing surface on the reach end of the case,

(h) the stem having an axial bore therein and a radial passage between the axial bore and the external surface of the stem to permit the passage of lubricating fluid and air therethrough.

2. A damped tool-holding assembly comprising:
(a) a hollow, elongated case having a reach end and a shank end, the reach end being closed and having an inner front face and the shank end being open;
(b) tool-holding means on the reach end of the case;
(c) the inner front face of the closed reach end of the case providing a frictional bearing surface;
(d) within the case a weighted elongated damper body having a reach end and a shank end, the reach end having an axial bore therein;
(e) a cap piece having a reach end and extending longitudinally beyond and spaced from the reach end of the damper body and having a frictional bearing surface on its reach end;
(f) the cap piece including a stem extending from the reach end thereof dimensioned for sliding fit in said axial bore for mounting the cap piece for longitudinal movement relative to the reach end of the damper body with the frictional bearing surface of the cap piece in frictional bearing engagement with the frictional bearing surface on the case;
(g) a sleeve having a closed end and slidably engaging the reach end of the damper body and enclosing said cap piece, the inner surface of the closed end of the sleeve being in slidable frictional engagement with said cap piece, the outer surface of the closed end of the sleeve being in slidable frictional engagement with the closed reach end of the case; and
(h) resilient pressure applying means directly engaging both the damper body and the cap piece for pressing the frictional bearing surface on the reach end of the cap piece against the frictional bearing surface on the closed inner surface of the sleeve and the frictional bearing surface on the closed outer surface of the sleeve against the frictional bearing surface on the closed reach end of the case, the pressure applying means comprising a screw axially mounted in the open shank end of the elongated case, and a spring interposed between the stem and the damper body, the spring pressure maintaining the sleeve, the cap piece and the damper body axially aligned within the elongated case;
(i) the stem having an axial bore therein and a radial passage between the axial bore and the external surface of the stem to permit the passage of lubricating fluid and air therethrough.

3. A damped tool-holding assembly comprising:
(a) a hollow, elongated case having a reach end and a shank end, the reach end being closed and having an inner front face and the shank end being open;
(b) tool-holding means on the reach end of the case;
(c) the inner front face of the closed reach end of the case providing a frictional bearing surface;
(d) within the case a weighted elongated damper body having a reach end and a shank end;
(e) a cap piece having a reach end and extending longitudinally beyond and spaced from the reach end of the damper body and having a frictional bearing surface on its reach end;
(f) mounting means mounting the cap piece for longitudinal movement relative to the reach end of the damper body with the frictional bearing surface of the cap piece in frictional bearing engagement with the frictional bearing surface on the case; and
(g) resilient pressure applying means directly engaging both the damper body and the cap piece for pressing the frictional bearing surface on the reach end of the cap piece against the frictional bearing surface on the reach end of the case, the resilient pressure applying means comprising a spring interposed between the cap piece and the damper body, and a screw mounted axially in the open shank end of the elongated case for adjustable movement in the longitudinal direction of the case, the screw operatively engaging the shank end of the damper body for moving the latter longitudinally and thereby adjusting the pressure of the spring against the cap piece and correspondingly adjusting the pressure of the frictional surface of the reach end of the cap piece against the frictional surface of the reach end of the case.

4. A damped tool-holding assembly comprising:
(a) a hollow, elongated case having a reach end and a shank end, the reach end being closed and having an inner front face and the shank end being open;
(b) tool-holding means on the reach end of the case;
(c) the inner front face of the closed reach end of the case providing a frictional bearing surface;
(d) within the case a weighted elongated damper body having a reach end and a shank end, the reach end having an axial bore therein;
(e) a cap piece comprising a stem having a reach end and dimensioned for sliding fit in said axial bore and extending longitudinally beyond and spaced from the reach end of the damper body and having a cap on the reach end provided with a frictional bearing surface positioned for laterally slidable frictional engagement with the frictional bearing surface on the inner front face of the closed reach end of the case; and
(f) a spring directly engaging both the damper body and the cap piece for pressing the frictional bearing surface on the reach end of the cap against the frictional bearing surface on the inner front face of the closed reach end of the case.

5. A damped tool-holding assembly comprising:
(a) a hollow, elongated case having a reach end and a shank end, the reach end being closed and having an inner front face and the shank end being open;
(b) tool-holding means on the reach end of the case;
(c) the inner front face of the closed reach end of the case providing a frictional bearing surface;
(d) within the case a weighted elongated damper body having a reach end and a shank end;
(e) a cap piece having a reach end and extending longitudinally beyond and spaced from the reach end of the damper body and having a frictional bearing surface on its reach end;
(f) a closed sleeve in slidable engagement with the reach end of the damper body and having a closed reach end, the closed sleeve being interposed between the inner front face of the elongated case and the cap piece, with the outer surface of the reach end of the sleeve being in laterally slidable frictional engagement with the frictional bearing surface on the inner front face of the closed reach end of the elongated case and the inner surface of the closed reach end of the sleeve being in frictional engagement with the frictional surface of the reach end of the cap piece; and (g) resilient pressure applying means directly engaging both the damper body and the cap piece for pressing the frictional bearing surface on the reach end of the cap piece against the frictional bearing surface on the inner front face of the closed reach end of the sleeve, for pressing the closed reach end of the sleeve against the closed reach end of the case.

6. A damped tool-holding assembly comprising:
(a) a hollow, elongated case having a reach end and a shank end, the reach end being closed and having an inner front face and the shank end being open;
(b) tool-holding means on the reach end of the case;
(c) the inner front face of the closed reach end of the case providing a frictional bearing surface;
(d) within the case a weighted elongated damper body having a reach end and a shank end, the reach end having an axial bore therein;
(e) a cap piece comprising a stem having a reach end and dimensioned for sliding fit in said axial bore and extending longitudinally beyond and spaced from the reach end of the damper body and having a cap on the reach end of the stem;
(f) a sleeve having a closed reach end and slidably engaging the reach end of the damper body and enclosing said cap, the inner surface of the closed reach end of the sleeve being in slidable frictional engagement with said cap, the outer surface of the closed reach end of the sleeve being in slidable frictional engagement with the frictional bearing surface on the inner front face of the closed reach end of the case; and
(g) a spring directly engaging both the damper body and the cap piece for pressing the cap against the inner front face of the closed reach end of the sleeve, for pressing the closed reach end of the sleeve against the closed reach end of the case, the pressure applying means including a screw axially mounted in the open shank end of the elongated case, the spring pressure maintaining the sleeve, the cap piece and the damper body axially aligned within the elongated case.

* * * * *